(12) United States Patent
Shei et al.

(10) Patent No.: US 12,495,931 B2
(45) Date of Patent: Dec. 16, 2025

(54) LATENT HEAT TOASTER CONTROL

(71) Applicant: Marmon Foodservice Technologies, Inc., Osseo, MN (US)

(72) Inventors: Steven Shei, Fort Wayne, IN (US); Benjamin Slotarski, Palatine, IL (US); Nicholas R. Mandarino, Aurora, IL (US); Jason Pittenger, DeKalb, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 1162 days.

(21) Appl. No.: 16/556,826

(22) Filed: Aug. 30, 2019

(65) Prior Publication Data

US 2021/0059472 A1 Mar. 4, 2021

(51) Int. Cl.
*A47J 37/08* (2006.01)
*G05D 23/19* (2006.01)

(52) U.S. Cl.
CPC .......... *A47J 37/0842* (2013.01); *G05D 23/19* (2013.01)

(58) Field of Classification Search
CPC ................ A47J 37/0842; A47J 37/0814; A47J 37/0821; A47J 37/0835; G05D 23/19
USPC ......... 99/324, 325, 326, 385, 329 RT, 329 P, 99/393; 219/391, 39
See application file for complete search history.

(56) References Cited

U.S. PATENT DOCUMENTS

| | | | |
|---|---|---|---|
| 3,693,536 A | | 9/1972 | Carville et al. |
| 4,238,995 A | * | 12/1980 | Polster ................ A47J 37/0635 99/341 |
| 4,734,562 A | * | 3/1988 | Amano ............... A47J 37/0635 219/412 |
| 5,250,775 A | * | 10/1993 | Maehara ............... H05B 6/685 219/771 |
| 5,558,793 A | * | 9/1996 | McKee .................. H05B 6/808 219/400 |
| 5,673,610 A | | 10/1997 | Stuck |
| 5,786,569 A | * | 7/1998 | Westerberg ............... F24C 7/06 426/243 |
| 6,013,900 A | * | 1/2000 | Westerberg .......... H05B 3/0076 219/405 |

(Continued)

FOREIGN PATENT DOCUMENTS

DE 102013020214 A1 6/2015
EP 0724856 * 7/1996

(Continued)

OTHER PUBLICATIONS

International Search Report and Written Opinion for International Application No. PCT/US2020/048167, mailed Nov. 18, 2020.

*Primary Examiner* — Thien S Tran
(74) *Attorney, Agent, or Firm* — Andrus Intellectual Property Law, LLP

(57) ABSTRACT

In a latent heat controlled toaster and process of toasting, the toaster includes at least one heating element. A controller receives electrical measurements including at least one of a voltage or a current and calculates a power delivered to the at least one heating element. The controller iteratively accumulates a system energy from the calculated power over time. The controller compares the accumulated system energy to a target energy and ends the toasting process when the accumulated system energy reaches the target energy.

20 Claims, 3 Drawing Sheets

(56) References Cited

U.S. PATENT DOCUMENTS

| | | | |
|---|---|---|---|
| 6,297,481 B1 * | 10/2001 | Gordon | H05B 3/0076 392/435 |
| 6,305,273 B1 | 10/2001 | Sherman | |
| 6,365,210 B1 | 4/2002 | Schaible, II et al. | |
| 6,543,337 B1 | 4/2003 | Brown | |
| 6,559,882 B1 | 5/2003 | Kerchner | |
| 6,670,586 B2 * | 12/2003 | Ingemanson | H05B 1/0263 219/492 |
| 6,853,920 B2 | 2/2005 | Hsiung et al. | |
| 7,067,777 B2 | 6/2006 | Lee et al. | |
| 7,217,906 B2 | 5/2007 | Veltrop et al. | |
| 7,765,918 B2 | 8/2010 | Garniss et al. | |
| D634,154 S | 3/2011 | Agnello et al. | |
| 8,415,830 B2 * | 4/2013 | Lim | H02J 3/14 307/41 |
| 8,637,792 B2 | 1/2014 | Agnello et al. | |
| 8,731,385 B2 * | 5/2014 | De Luca | H05B 3/0076 392/407 |
| 8,789,459 B2 | 7/2014 | Chung et al. | |
| 9,210,740 B2 * | 12/2015 | Libman | H05B 6/705 |
| 11,122,934 B2 * | 9/2021 | Feldman | A47J 27/004 |
| 11,206,949 B1 * | 12/2021 | Cheng | A47J 37/085 |
| 2003/0197002 A1 * | 10/2003 | Lile | A47J 37/0842 219/501 |
| 2004/0206248 A1 | 10/2004 | Lawson | |
| 2004/0216618 A1 * | 11/2004 | Lile | A47J 37/0871 99/343 |
| 2006/0081135 A1 | 4/2006 | Britton et al. | |
| 2006/0201334 A1 * | 9/2006 | Belanger | A47J 37/0842 99/389 |
| 2007/0254078 A1 | 11/2007 | Calzada et al. | |
| 2009/0034944 A1 | 2/2009 | Burtea et al. | |
| 2010/0239724 A1 | 9/2010 | Veltrop et al. | |
| 2010/0275789 A1 | 11/2010 | Lee et al. | |
| 2011/0303100 A1 | 12/2011 | Agnello et al. | |
| 2012/0088019 A1 * | 4/2012 | Bourg, Jr. | A47J 37/044 426/466 |
| 2012/0163780 A1 * | 6/2012 | De Luca | H05B 3/0076 392/416 |
| 2012/0164022 A1 * | 6/2012 | Muginstein | H05B 6/72 405/128.7 |
| 2012/0294595 A1 | 11/2012 | Veltrop et al. | |
| 2012/0295210 A1 | 11/2012 | Veltrop et al. | |
| 2013/0092682 A1 * | 4/2013 | Mills | H05B 1/0263 219/702 |
| 2014/0144331 A1 | 5/2014 | Hensel et al. | |
| 2014/0322408 A1 | 10/2014 | Khosla et al. | |
| 2015/0289324 A1 | 10/2015 | Rober et al. | |
| 2016/0120362 A1 * | 5/2016 | Fields | A47J 37/08 99/378 |
| 2016/0198885 A1 | 7/2016 | Logan et al. | |
| 2016/0266594 A1 * | 9/2016 | Kauffman | G06Q 50/06 |
| 2016/0327281 A1 | 11/2016 | Bhogal et al. | |
| 2017/0074522 A1 | 3/2017 | Cheng | |
| 2017/0195542 A1 | 7/2017 | Thomas et al. | |
| 2017/0332841 A1 | 11/2017 | Teischmann | |
| 2018/0070756 A1 * | 3/2018 | Vengroff | A47J 36/321 |
| 2018/0131187 A1 * | 5/2018 | Batzler | H02J 3/14 |
| 2018/0202667 A1 * | 7/2018 | Cheng | H04N 23/80 |
| 2018/0289209 A1 | 10/2018 | Yazvin et al. | |
| 2018/0338354 A1 * | 11/2018 | Bassill | A47J 36/32 |
| 2019/0387926 A1 * | 12/2019 | Shei | A47J 27/14 |
| 2022/0337081 A1 * | 10/2022 | Davies | H02J 3/14 |
| 2023/0344959 A1 * | 10/2023 | Shei | H04N 5/33 |

FOREIGN PATENT DOCUMENTS

| | | | | |
|---|---|---|---|---|
| EP | 0563698 B1 | | 1/1997 | |
| FR | 2742034 | * | 6/1997 | |
| FR | 2769456 | * | 4/1999 | |
| WO | WO 02060302 A2 | | 8/2002 | |
| WO | WO02095521 | * | 11/2002 | |
| WO | WO 2014053002 A2 | | 4/2014 | |
| WO | WO-2020254525 A1 | * | 12/2020 | H02J 13/00001 |
| WO | WO2021041649 | * | 4/2021 | |

* cited by examiner

LATENT HEAT TOASTER CONTROL

BACKGROUND

The present disclosure is related to control of thermal processes. The present disclosure relates to the control of thermal processes based upon a determination of an accumulated latent heat in the thermal process. More specifically, the latent heat based control of toasting processes in the field of food preparation are disclosed.

Many restaurants serve toasted bread or English muffins as regular menu items. Many other menu items include sandwiches that are comprised of toasted baked goods including tasted bread, buns, or English muffins.

Toasted food products have a distinctly different flavor than the same products prior to toasting. Toasting a food product also changes the bread product's color and its texture. In addition to changing flavor, color, and texture, the toasting process often gives off a pleasing aroma.

Toasting food products, for example, sliced bread, English muffins, bagels, pizza crust, and other baked goods or prepared food products for example pizzas or sandwiches, is usually accomplished using radiant or conductive energy transfer into the baked good from one or more heat sources. The process of toasting, which is also referred to herein as browning, is the result of a chemical reaction known as the Maillard reaction. The Maillard reaction is the reaction between carbohydrates and proteins that occurs upon heating and which produces browning.

It is believed that when the Maillard reaction goes too far or too long, carbohydrates in a bread product will oxidize completely and form carbon. Carbon absorbs light. The surface of a burned bread product, therefore, appears black. The term "burn" is therefore considered to be the thermally-induced oxidation of carbohydrates to a point where the carbon content of the bread product surface is high enough to absorb visible light that impinges on the bread product surface and therefore makes the surface of the bread product appear to an ordinary observer to be black in color.

There are a large variety of toasters that exist and are used in the industry. A platen toaster uses a vertical or near-vertical heating platen and a slowly rotating conveyor which urges a food product against the platen while it simultaneously drags a food product downwardly and across the platen's hot surface. The toasting process is terminated by the conveyor moving the food product beyond contact with the platen. A conveyor toaster is conventionally oriented horizontally with (natural) gas fired burners or equivalent electrical heat sources arranged above, below, or both to a conveyor upon which the food product to be toasted is moved through the toaster. The toasting process is terminated by the conveyor moving the food product beyond the heat sources. In still further embodiments, the food product is held within a toaster in a fixed position relative to one or more heating sources which direct heat energy towards the food product. The toasting process is terminated by turning off the heat sources and/or removing the food product from the toaster.

A well-known problem with prior art toasters of all kinds is that they often cannot consistently achieve a uniform browning or toasting across bread product surface in the same amount of time. Because of their mass, surface irregularities, moisture content, and temperatures, bread products like English muffins are especially difficult to uniformly and consistently brown in a short amount of time period because the peaks and valleys of an English muffin's surface are at different distances from the heat source that effectuates the toasting process. Toasting solutions exist, for example, those previously disclosed by the Applicant in US2010/00239724, entitled "Toaster with Cooling Air Stream"; US2018/0289209, entitled "Toaster with Adjustable Conveyor"; and U.S. patent application Ser. No. 16/448,359, entitled "Infrared Toaster", all of which are hereby incorporated by reference in their entireties.

Additional control of toasting processes is, therefore, desired that provide more consistent toasting output, for example in combination with toasting a variety of food products, with higher throughput speeds, and/or in a more energy-efficient manner. Since many restaurant operators need and prefer to be able to toast bread products like English muffins as quickly as possible, attempts to shorten browning time by simply increasing the input energy usually results in more bread products being burned rather than toasted. Similarly, consistent toasting is typically achieved at a high heat with a toasting system that is kept at temperature in anticipation of toasting needs. This can result in high wasted energy as the toaster may be kept at temperature without any active toasting of food products occurring. A method of toaster control that helps to consistently provide uniform browning in a relatively short period of time, and enables toaster designs that address some or all of the issues noted above would be an improvement over the prior art.

BRIEF DISCLOSURE

In an example of a toaster for toasting a bread product in a toasting process, the toaster includes at least one heating element. The at least one heating element is electrically energizable to carry out the toasting process. A power supply is configured to provide electrical power to the at least one heating element. A power sensing circuit includes a voltmeter to acquire a voltage relative to the at least one heating element. The power sensing circuit includes an ammeter to acquire a current relative to the at least one heating element. A controller receives the voltage and the current from the power sensing circuit and calculates a power delivered to the at least one heating element. The controller iteratively accumulates a system energy from the calculated power over time. The controller compares the accumulated system energy to a target energy and ends the toasting process when the accumulated system energy reaches the target energy.

In further examples of toasters, the controller may receive a product ID and from the product ID, the controller identifies the target energy for the bread product to be toasted. The power sensing circuit may be arranged between the power supply and the at least one heating element. The controller may end the toasting process by operating the toaster to eject the bread product from the toaster. Toasters may also include at least one ambient temperature sensor. The controller may receive a measurement of ambient temperature and use the measurement of the ambient temperature in the iterative accumulation of the system energy.

Toasters may further calculate an initial energy at the start of the toasting process with the controller and the controller combines the initial energy into the accumulated system energy. The controller may end the toasting process by ending energization to the at least one heating element. The toaster may further include a timer that starts to count an elapsed time when energization to the at least one heating element ends and ends the elapsed time when a next toasting process begins. The timer may provide the elapsed time to the controller and the controller calculates the initial energy based upon the elapsed time. The controller may receive a final accumulated energy from the end of a previous toasting process. The controller may receive an energy decay model. The controller may further calculate the initial energy from the final accumulated energy, the energy decay model, and the elapsed time.

An example of a method of toasting control includes energizing at least one heating element at a start of a toasting process. A voltage across the at least one heating element is acquired. A current to the at least one heating element is acquired. A power delivered to the at least one heating element is calculated. A system energy is iteratively accumulated from the calculated power over time. The accumulated system energy is compared to a target energy. The toasting process is ended when the accumulated system energy reaches the target energy.

Further examples of the method of toasting control include receiving an identification of a bread product for the toasting process. From the identification of the bread product, the target energy associated with the bread product is identified, the target energy being representative of a toasting level of the bread product. An energy loss over time during the toasting process is calculated. The system energy accumulated from the power over time is reduced based upon the calculated energy loss over time. The controller may receive an ambient temperature measured by an ambient temperature sensor. The controller may use the ambient temperature in calculating the energy loss over time during the toasting process.

The method of toasting control may further include calculating initial energy at the start of the toasting process and adding the initial energy into the system energy. Ending the toasting process may include ending energization to the at least one heating element. An elapsed time may be counted by a timer that starts when energization to the at least one heating element ends and the timer ends when the toasting process starts. The initial energy at the start of the toasting process may further be calculated based upon the elapsed time from the timer. The controller may receive final accumulated energy from a previous toasting process and receive an energy decay model. The initial energy may further be calculated from the final accumulated energy, the energy decay model, and the elapsed time. The energy decay model may be empirically determined for the toaster.

Identification of a bread product may be received for the toasting process. From the identification of the bread product, an initial toaster setting and an adjustment criteria may be identified. The at least one heating element may be energized according to the initial toaster setting at the start of the toasting process. The accumulated system energy is compared to the adjustment criteria and an operation of the toaster may be adjusted when the adjustment criteria is met. The operation of the toaster that is adjusted may be a conveyor speed. Acquiring the voltage across the at least one heating element may include measuring a total voltage to the toaster and subtracting a voltage drop attributable to electrical systems of the toaster besides the at least one heating element. Acquiring the current across the at least one heating element may include measuring a total current to the toaster and subtracting a current draw attributable to electrical systems of the toaster besides the at least one heating element.

DETAILED DISCLOSURE

Figure 1:
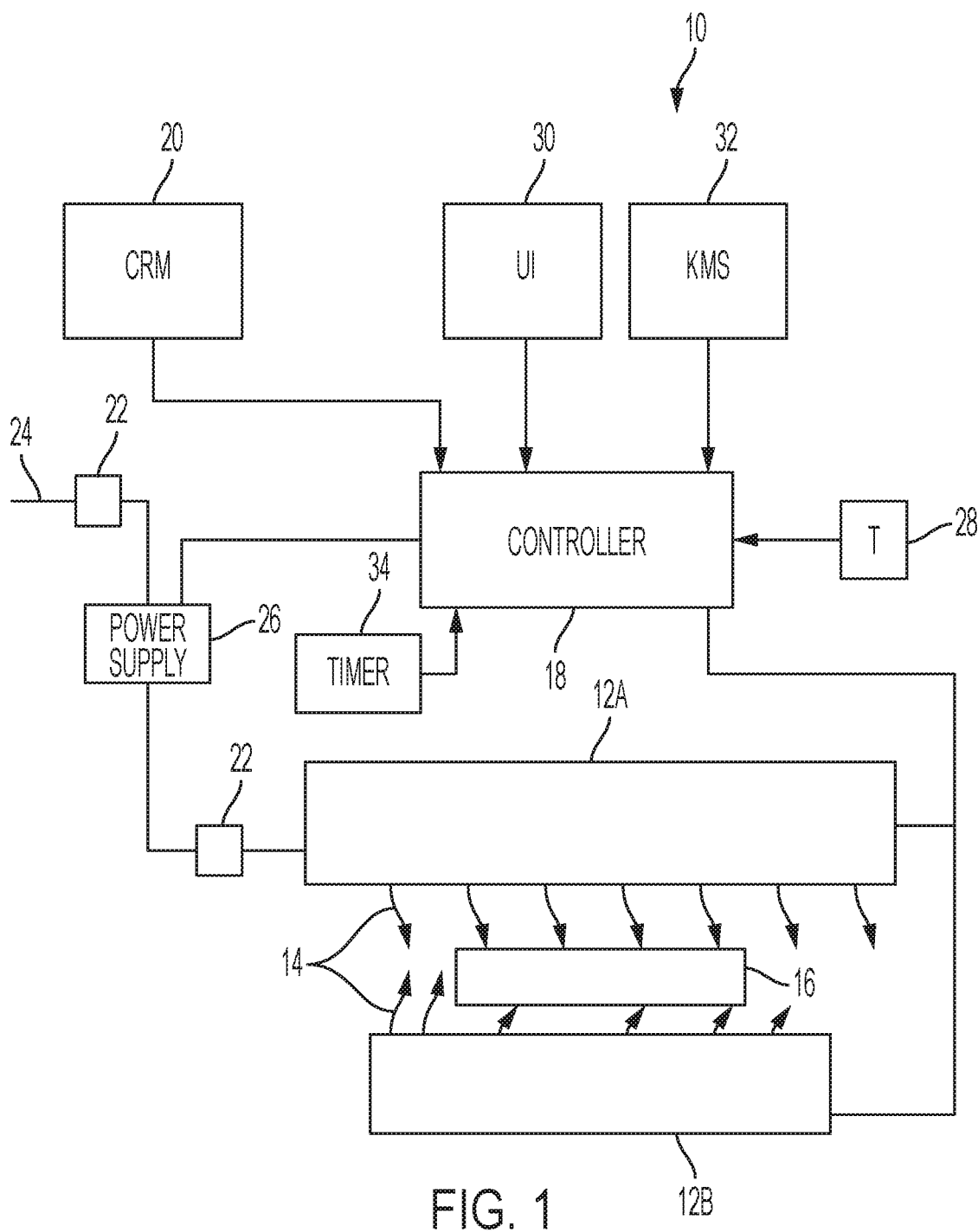
FIG. 1 is a system diagram of an exemplary embodiment of a heating system with latent heat control.

FIG. 1 depicts an example of a toaster 10. The toaster 10 uses at least one heat source 12. The heat source may be any of a variety of heat sources including resistive wire, cal rod, gas combustion, LED, or others as will be recognized by one of ordinary skill in the art. As depicted in FIG. 1, the toaster 10 may have a heat source that is exemplarily two IR heat sources 12. The heat sources 12 are arranged to direct IR energization 14 at a food product 16. In the embodiment depicted in FIG. 1, and as will be explained in further detail herein, the heat sources 12 may be configured and/or operated to either simultaneously toast both sides of the food product 16, or may be configured and/or operated such that one heat source 12 provides a toasting heat, while the other heat source directs supplemental heat energy towards the food product 16 to improve the efficiency of the toasting process. The food product is exemplarily a bread product that is desired to be toasted, although thermal treatments, exemplarily cooking, searing, broiling, or baking may be achieved in other embodiments. The bread products may include but are not limited to sliced bread, English muffins, bagels, pizza, and flatbread, rolls, or buns.

As described herein, the one or more heat sources 12 are controlled to complete a thermal treatment process, for example, to toast a food product 16, by monitoring the energy consumption and modeling the latent heat of the system. Completion of the thermal treatment process is defined by the accumulated system heat delivered to the object of treatment, for example, the food product 16. Upon accumulation of the defined heat for the thermal treatment process, the process may be terminated to stop the delivery of heat to the object. The process may be terminated in a variety of ways as will be described herein, including but not limited to ejection of the food product 16 from the toaster, or limiting or otherwise modifying the operation of the heat sources 12 to limit further future thermal treatment of the food product, if the food product will remain in the toaster for a longer period of time.

The toaster 10 includes a controller 18. It will be recognized that the controller 18 is exemplarily any of a variety of known controller circuits, integrated circuits, microcontrollers, microprocessors, and associated circuitry. The controller 18 may exemplarily include a central processing unit (CPU) and integrated memory in the form of a computer-readable medium (CRM) 20, although in embodiments the computer-readable medium 20 comprising the memory may be a separate component or communicatively connected to the controller 18 within the toaster. The controller 18 exemplarily includes a processor that accesses software or firmware in the form of computer-readable code stored on the non-transient computer-readable medium as either integrated memory or external memory. The processor executes the computer-readable code as an instruction set to carry out the functions as described herein, including the receipt of input, calculations, and outputs as will be described. The CRM 20 exemplarily further stores the algorithms and models as referred to herein in relation to, for example, energy decay, energy loss, or energy accumulation. In still further examples, it will be recognized that variables, constants, or correction factors may further be stored in the CRM for use in the methods as described herein. While some models or algorithms may be defined as equations, it will be recognized that others may be defined as look-up tables with associated values based upon the input variables. Some models or algorithms stored in the CRM may be empirically determined through a calibration process and testing of the toaster unit before operational use. Other models or algorithms may be empirically refined through calibration or testing of the toaster unit.

The toaster 10 includes one or more power sensing circuits 22. The power sensing circuits may be any of a variety of power meters or wattmeters as may be known or available. Further examples of power sensing circuits 22 may include any of a variety of current sensors, otherwise referred to as ammeters, in combination with any of a variety of voltage sensors, otherwise referred to as voltmeters. Still other power sensing circuits 22 may use one or the other of voltage sensors and/or current sensors in combination with a determination of resistance, for example of a resistive wire heating element. Ammeters include, but are not limited to Hall effect sensors or shut sensors. Voltmeters may measure voltage directly across a large resistance or as an isolated transformer voltage. The power sensing circuits may include the associated electronics to output the current and/or voltage in a digital format, or the power sensing circuit may provide an analog output. Similarly, the power sensing circuit may include the electronics to produce an output of power, for example as the product of the measured voltage and the measured current. In another example, the power sensing circuits 22 may provide the measured voltage and the measured current to another circuit, for example, the controller 18, for calculation of the electrical power at that power sensing circuit 22.

The toaster 10 may include a single power sensing circuit 22. The power sensing circuit 22 may be located at the source of electrical power to the toaster 10, for example at the plug connection 24 to the utility or mains electricity. A single power sensing circuit 22 may be located along the electrical connection between a power supply 26 and the one or more heat sources 12. In still further examples, and additional examples discussed herein but not depicted in FIG. 1, power sensing circuits 22 may be positioned at both of these locations, and/or others. As will be described in further detail herein, the power sensing circuit 22 located at the connection 24 can provide a measurement of the total power available to the toaster 10, from which the power consumption by individual components can be subtracted to account for the energy losses in the system. A power sensing circuit 22 located between the power supply 26 and the one or more heat sources, can provide a direct measurement of energy consumption by the heat sources 12. As explained in further detail herein, the heat energy output by the heat sources 12 can be calculated from the measured heat source energy consumption. In addition to the power sensing circuits and locations described above, in other examples, particularly if the energy consumption of a particular circuit or component of the toaster is not known or variable, power sensing circuits may be arranged to measure the energy consumption of these circuits/components as well for incorporation into any models of heat generation and dissipation as described in further detail herein.

The toaster 10 may include additional sensors as well which provide additional information to the controller 18, particularly temperature sensors. In one example, the toaster 10 includes at least one ambient temperature sensor 28. As the dissipation of latent heat energy is in part a function of the temperature gradient surrounding the toaster 10, at least one ambient temperature sensor 28 provides information regarding the environment around the toaster 10. Other additional sensors, including a draft sensor, for example, an anemometer, may provide information about the environment around the toaster 10 which may be incorporated into any heat generation and dissipation models used by the toaster. The controller 18, may further receive information regarding the operation of other components of the toaster 10, including, but not limited to the operation of blowers or fans, the receipt or ejection of a bread product from the toaster, or initiation of a toasting process.

The toaster includes a timer 34. While the timer 34 may be a part of the controller 18 or a CPU embodying the controller 18, the timer 34 may be a separate timing circuit in the toaster as well. The timer 34 operates, as described in further detail herein, to measure an elapsed time between the end of a toasting process, often the end of energization of the heating elements 12 until the start of a subsequent toasting process, often the start of energization of the heating elements. It will be recognized that in a continuous toasting operation toaster, the measured elapsed time may be zero as new toasting processes are started on a continuous basis. In examples where there is a delay between toasting processes, this elapsed time is used to determine the cooling of the system energy of the toaster between toasting processes. The timer may be directly connected to the heating elements 12 to determine when the heating elements are energized, or the timer may receive signals from the controller indicative of the energization instructions or status of the heating elements 12.

The toaster 10 additionally may include a user interface 30 by which the toaster 10 receives one or more user inputs to control a toasting operation. The user interface 30 may be physical buttons or may be a touch-enabled graphical display. In still further examples, the user interface 30 may be presented on a personal computing device communicatively connected to the toaster 10, for example through Wi-Fi or Bluetooth communication protocols. Examples of inputs that may be received include one-sided or two-sided toasting, an identification of the food product, and/or a desired toasting level.

In still further embodiments, the controller 18 of the toaster 10 may be communicatively connected to a kitchen management system (KMS) 32, which may exemplarily be a locally implemented or remotely implemented computer system that operates to manage the customer orders, order completion status, monitor inventory levels and operation of devices in the kitchen, and/or to provide operational instructions to devices within the kitchen. In an exemplary embodiment, a communicative connection between the controller 18 and the KMS 32 may enable the KMS to provide the operational instructions, for example, the type of food product to toast, the sides of the food product to toast, and the toasting level to be achieved to the controller 18 without further input from a user or worker. While not depicted, a food product dispenser, for example, a baked goods dispenser, may be operatively connected to the toaster 10 and communicatively connected to the KMS, and coordinated operation between the devices may result in the automated loading of the toaster 10 with the appropriate baked good and operation of the toaster 10 to achieve the desired toasting level of that baked good.

Figure 2:
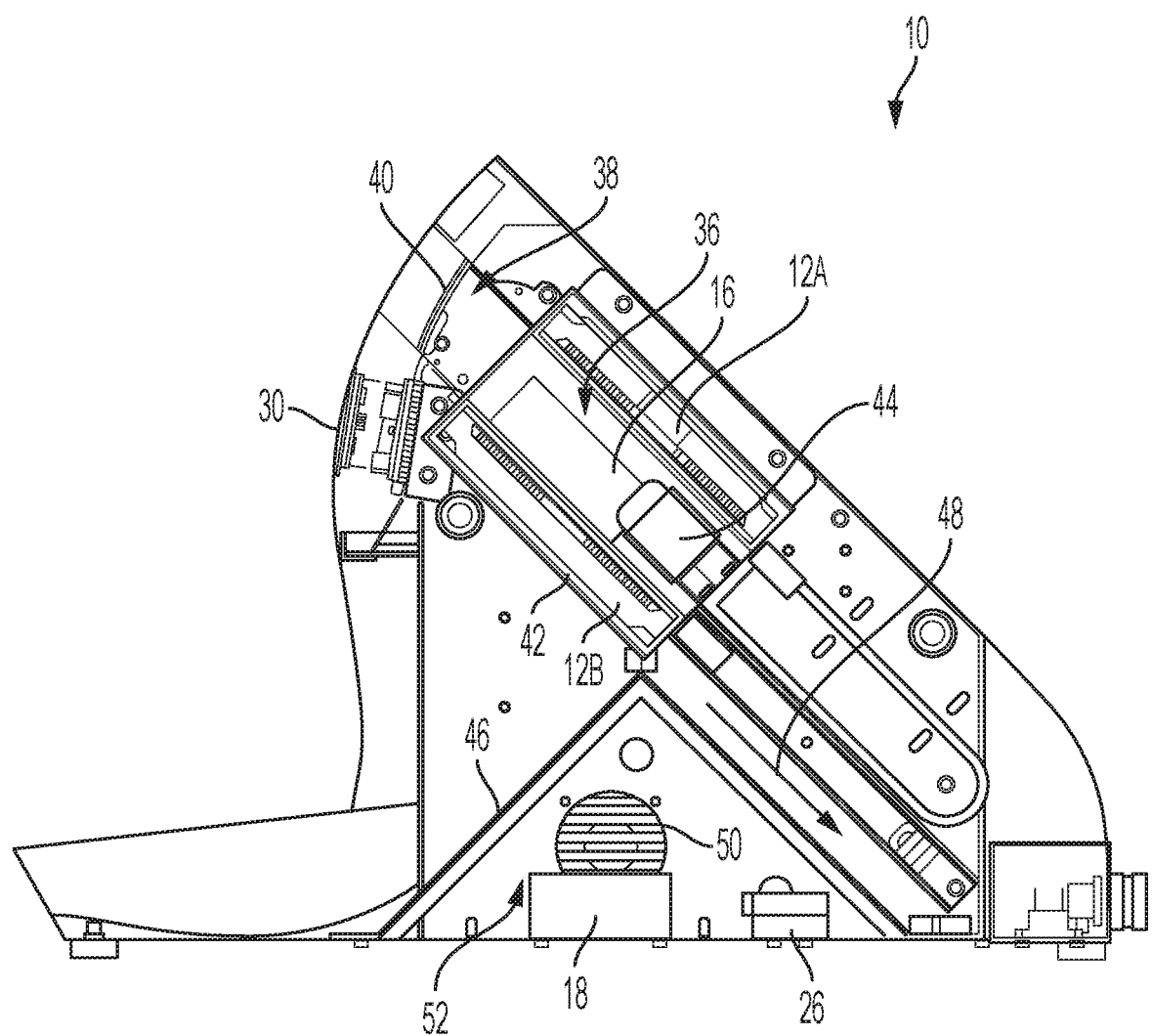
FIG. 2 depicts an example of a toaster.

FIG. 2 depicts an example of the toaster 10. It will be recognized that like reference numerals between these FIG. 1 and FIG. 2 are used to indicate like components and to incorporate the description of those components as provided earlier herein. It will be recognized that still further embodiments may combine those features as described above with FIG. 1 with the features as described herein with respect to FIG. 2 in addition to the other disclosure as provided in the present application to arrive at embodiments within the scope of the present disclosure.

The toaster 10 is arranged in an angled orientation. The toasting area 36, as well as much of the operational components of the toaster 10, are arranged at an angle. The user may insert the food product 16 directly into an opening 38 that is selectively blocked by safety door 40. The safety door 40 may serve multiple purposes. In a first purpose, the safety door 40 blocks user access to the toasting area 36 relative to the IR heating source 12. This protects the user such that when the safety door 40 is closed, a corresponding limit switch (not depicted) is activated enabling the IR heat source 12 to be activated and heated. When the safety door 40 is open, the limit switch is also opened and the IR heating source 12 is prevented from energizing. The food product 16 is exemplarily a bread product and is loaded into the toaster 10 with the crumb side of the food product 16 facing up.

The toasting area 36 interior of the opening 38 is also arranged at an angle and is, for example, defined by a top IR heating source 12A, and a bottom IR source 12B. The bottom IR source 12B also exemplarily forms a tray 42. A cradle 44 is exposed at the internal end of the toasting area 36 and serves to receive the food product 16 within the toasting area 36 and to help to align the food product 16 relative to the top IR source 12A and to the bottom IR source 12B for consistent and repeated toasting. Upon completion of the toasting operation, the tray 42, including the bottom IR source 12B slides in the direction of arrow 48 internal to the toaster 10 to move the tray 42 out of the way of the toasted food product 16. The toasted food product 16 falls out of the toasting area 36 onto the exit ramp 46 to dispense from the toaster 10. The example of the toaster 10, further provides the advantage of functional returning of the toasted food product to a location similar to the location wherein the food product was first loaded into the toaster and in a same orientation (e.g. crumb side up) as in which the food product was loaded into the toaster 10.

The toaster 10 may further include an electronics compartment 52, at least partially separated from the toasting area 36. The electronics compartment 52 exemplarily includes the controller 18 and the power supply 26, as well as other of the components as described in the present application and any associated wiring. A fan 50 may further be positioned within the compartment to operate to keep the electronics cool in order to promote proper function and longevity of the electronics.

As will be described in further detail herein, a latent heat method is used to control the operation of the toaster in order to achieve a specified toasting level. The latent heat method as described herein can be used as a primary toasting control process or may be used in other toasting control operations, including, but not limited to optical toasting control or perform an alternative calculation of the toasting level that is independent of the digital images acquired by the camera. The latent heat method thus can provide a control on the toasting operation in the event of an image acquisition error by the camera, image processing errors, or malfunction of the cameras and/or light sources required for the image acquisition. In still further embodiments, the toaster may instead operate in a latent heat controlled mode in the event that one or more errors prevent control based upon the digital image acquisition as described above.

In the latent heat method, the toasting time is adjusted based upon the latent heat stored in the toaster. This is calculated by keeping track of how much energy has been input into the toasting system from the heating cycles and how much energy has been lost based upon an assumed toasting system cooling curve. In such an embodiment, an expected toasting time is calculated based upon the desired toasting level and the heat already in the toasting system and the ongoing input of heat energy into the toaster during the toasting operation. If this expected toasting time is exceeded or is exceeded by a predetermined threshold percentage or threshold percentage based upon the desired toasting level, then the system may override the toasting process and eject the bread to prevent the bread being over toasted or burned.

Prior attempts to measure, and control for, the latent heat in a toasting system have relied upon direct temperature measurement. Such systems measure one or more reference temperatures within the toasting system. While such direct measurements would seem to be accurate, the inventors have determined that reference-temperature based latent heat controls are inadequate to control the toasting process. Rather, a process and system of latent heat monitoring and control based upon real-time input voltage and amperage draw by the toaster has been developed. The voltage and amperage draw into the toaster are measured and monitored in real-time. These values enable an accurate calculation of the input energy into the toaster. In the toaster, electrical energy is converted into heat energy. Once ancillary toaster energy use (e.g. to meet processor and graphical display operational needs) is accounted for, the remaining input energy is directly related to the heat output by the heating elements.

The present inventors have found that the energy consumption, and thus, the heat output by the heating elements can provide an improved reflection of the conditions in the toaster that lead to toasting, and thus improved toasting control. Temperature measurements within the toaster suffer from the drawback of variability in the heat transfer from the heating elements to the temperature sensors and therefore present challenges to the prediction of toasting progression therefrom.

Figure 3:
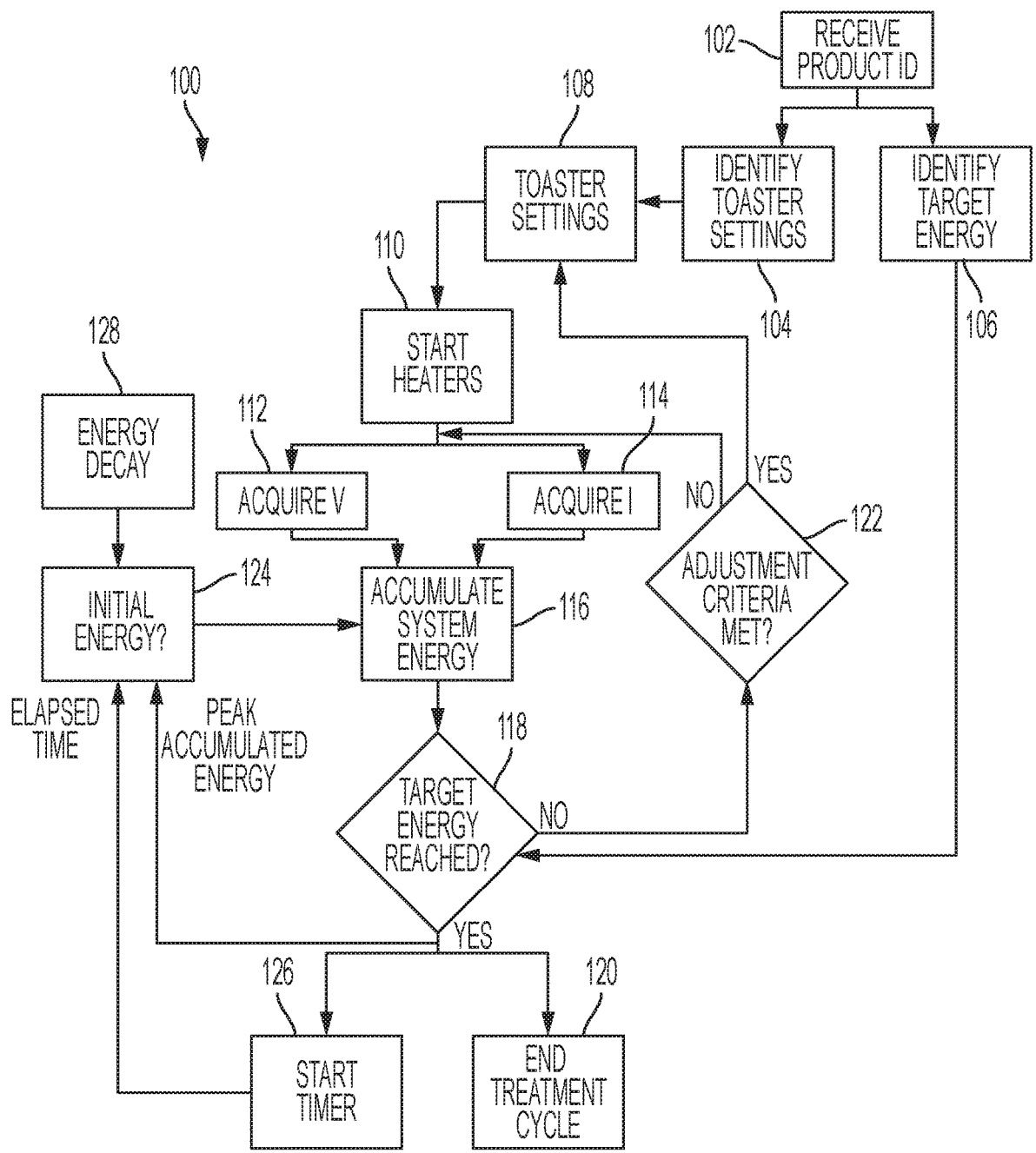
FIG. 3 is a flow chart of a method of latent heat control.

FIG. 3 is a flow chart that presents an exemplary embodiment of a method 100 of latent heat control of a toaster, which may exemplarily be used with an embodiment of a toaster as described in the present application. It will be recognized that the flow chart as presented in FIG. 3 is for exemplary purposes and that other implementations of the present disclosure may use more or fewer acts as depicted and described therein while remaining within the scope of the present disclosure.

An identification of a product is received at 102. The product ID received at 102 may include an identification of a particular baked good to be toasted. The product ID received at 102 may also include an indication of a specific toasting level. The product ID may be received through a user input into a user interface of the toaster or may be received by the toaster through a communicative connection with the KMS of the restaurant. The product identification is exemplarily associated with toasting data or information associated with the operation of the toaster to toast the particular type of bread product. For example, based upon the received product ID, toaster settings are identified at 104 and a target energy is identified at 106. The toaster settings identified at 104 and the target energy identified at 106 may be so identified by finding this information in one or more lookup tables and associated with the product ID.

In examples, the product ID may identify a bagel to be toasted. The bagel may be toasted on only the crumb side. Toaster settings associated with the product ID may be an indication to operate only a top heating element of a toaster (or both top and bottom heating elements, if so established for bagel toasting). The toaster settings identified at 104 may further include a duty cycle or a target current draw of the heater during toasting. The toaster settings may further include a minimum toasting time. The toaster settings may also include a conveyor speed for toasters that include conveyors. The toaster settings may optionally include an adjustment and an adjustment criteria for initiating that adjustment, as will be described in further detail herein. The target energy identified at 106 is the amount of accumulated energy, as will be explained in further detail herein, defining when the toasting process is complete for the bread product. The target energy identified at 106 may be adjusted based upon an indication of a specified toasting level of the bread product, with a lightly toasted bread product requiring less target energy and a darkly toasted bread product requiring more target energy.

At 108, the toaster settings identified at 104 are established at the toaster and the toaster is ready for the toasting operation. Assuming that the toaster is otherwise ready to perform the toasting operation (e.g. loaded with the bread product, access door 40 is closed), the toaster energizes the heaters at 110. The heaters are electrical heaters but may include, but are not limited to resistive wire, electric lamp, LED, quartz, or other arrangements of electrical heating elements.

Once the heaters are receiving electrical energization to start the toasting process, the input voltage (V) is acquired at 112 and the input current (I) is acquired at 114. In an example, the input voltage and input current are acquired by direct measurement using the power measurement circuit as described above and/or by individual measurements of input voltage and input current to the heating elements. In other examples, the input voltage and input current are acquired by measuring the power input into some or all of the toaster system and accounting for or otherwise subtracting the power consumed by other toaster components (e.g. processor, CPU, power supply, conveyor belt, fans, graphical display, etc.) from the total power supplied to the toaster. As part of a system settings or calibration process, a power consumption of the non-heating element components may be known or otherwise stored at the CPU. This known value may be subtracted from the measured total power and/or total voltage and current supplied to the toasting device. In still further examples a combination of the two techniques may be used, for example by using one example to confirm the other (for example, by using the measured values if the calculated values are within an error range e.g. 2.5%) or taking an average of the results of the two techniques.

Next, the energy output by the heating elements is accumulated at 116. The system energy is reflected as:

$$\text{System Energy} = \Sigma(\text{Energy}_{IN} - \text{Energy}_{OUT}) \quad \text{(Eq. 1)}$$

As reflected in Eq. 1 the current system energy is a summation of the energy input into the toasting system and the energy lost due to cooling. Generally, the energy lost due to cooling in any system is reflected in Eq. 2.

$$\text{Energy}_{DECAY} = Ae^{Bt} \quad \text{(Eq. 2)}$$

The energy decay is based upon existing energy A and a constant B. As explained in further detail herein, when applied to the specific application of toasting control, the constant may represent the thermal characteristics of the construction of the toaster and any ambient conditions surrounding the toaster. This may be empirically determined to reflect the thermal characteristics of the construction of the toaster for the normal operating conditions of the toaster.

The energy into the toasting operation is obtained from the input voltage and input current to the heating elements over time and may be represented as:

$$\text{Energy}_{IN}(t) = \int_0^{TT} v(t)*i(t)dt \quad \text{(Eq. 3)}$$

Where TT is the total toasting time. While the above equation uses Ohms Law to calculate power based upon voltage (V) and current (I), other electrical relationships can similarly be used to calculate Energy$_{IN}$, for example, $P=V^2/R$, $P=I^2*R$, or P=V*I*(duty cycle) may also be used.

As will be discussed in further detail herein, the generated heat is also continuously lost or dissipated from the system too. The loss of energy is based in part upon the current System Energy (Energy$_{SYS}$)

$$\text{Energy}_{OUT}(t) = \int_0^{TT} \text{Energy}_{SYS}(t-1)*Cdt \quad \text{(Eq. 4)}$$

When Energy$_{IN}$ exceeds Energy$_{OUT}$, the system accumulates energy in the form of heat. As accumulated energy increases, the system loses an increased amount of energy as reflected in Eq. 4. The constant C reflects the thermal characteristics of the construction of the toaster and any ambient conditions of the toaster. This can be empirically determined for example by temperature analysis measuring the temperature change over time given known input energy. As explained herein, the constant C may itself have components reflective of these two sources of thermal considerations.

When Energy$_{OUT}$ exceeds Energy$_{IN}$, the system loses energy and cools. Between toasting operations, no heating energy is added to the system and the energy dissipates according to a static cooling curve. This is reflected by either of the Energy$_{DECAY}$ of Eq. 2 or the Energy$_{OUT}$ of Eq. 4 when there is no energy being added to the system, resulting in a decaying total system energy. Once empirically determined, these values may be stored into a computer readable medium accessible by the CPU. As will be described in further detail herein, the empirically determined values of B and C may be adjusted based upon other measurements or environmental conditions and therefore the values of B and C represented in the form of a further algorithm or look-up table based upon this additional information. It will be recognized that while B and C are similar in what those values represent, in instances, the actual values of those constants may be different, reflecting the specific applications in Eq. 2 and Eq. 4.

As reflected in the integral nature of the accumulation of the input energy, the accumulation of the total energy at 116 occurs in an iterative manner at the sampling rate of the input voltage and current measurements over the course of the toasting process. As each calculation of accumulated energy is performed at 116, this result is evaluated at 118 against the target energy identified at 106 required to toast the identified bread product. As previously noted, the toasting level of the bread product (e.g. light, medium, or dark toasting) is further reflected in this target energy. In an example, the target energy is determined for each bread product based upon empirical testing of the respective bread products. The Target Energy may be expressed by the following equation:

$$\text{Energy}_{TARGET} = (E\max - E\min) - Ae^{Bt} + E\min \quad \text{(Eq. 4)}$$

In Eq. 5, the terms Emax and Emin are empirically determined for each bread product where Emax is the energy, in Joules, needed to toast the bread product to a reference doneness level from a cold start of the toaster. This represents the toaster operation requiring the most energy required to achieve the reference doneness level in the bread product. Relatedly, Emin is the energy, in Joules, needed to toast the bread product to the reference doneness level in a full heat or continuous operation condition of the toaster and represents the least energy required to achieve the reference doneness level.

It will be recognized that in an embodiment wherein the toaster can be adjusted to achieve multiple doneness levels, that the doneness levels may be reflected in the Target Energy in multiple ways. In a first example, the doneness levels for each bread product may be defined as percentages or other scalar adjustment to the Target Energy. For example, if the reference doneness level is an "average" doneness level or a "3" on a scale of 1-5, then doneness levels 1 and 2 may, for example, be percentage decreases of the Target Energy, e.g. 80% and 90% of Target Energy, while doneness levels 4 and 5 are percentage increases of the Target Energy, e.g. 110% and 120% of Target Energy. It will also be recognized that the doneness levels may not be linear as in the example above and instead may be another mathematical relationship, for example logarithmic, e.g. doneness levels 1-5 are respectively 76%, 92%, 100%, 104%, and 106% of the Target Energy. It will be recognized that these doneness levels may be empirically determined from toasted examples of each bread product. The adjusted Target Energy values based upon doneness level may be calculated from defined adjustment values related to each doneness level or may be stored in a lookup table based upon bread product and doneness level.

Further, the Target Energy, once defined for the toasting operation, can be used to calculate an estimated toasting time, for example by using an estimate of the energy accumulation in a future operation of the toaster. The estimated energy accumulation calculations can be solved for time with the Target Energy as an input, to arrive at this time estimate. Such a time estimate may be used in connection for coordination of other devices or worker actions in relation to the estimated toasting time, or to operate a toaster or other kitchen device based upon this estimate.

The operation of the heating elements continues, the input voltage and input current measured, and the accumulation of energy calculated until the accumulated system energy reaches the target energy at which the toaster operates to end the treatment cycle at 120. In the example provided, the treatment cycle is a toasting process and the toasting process may be ended by ending power to the heating elements and ejecting the bread product from the toasting chamber. While not limiting ejection methods, such methods may include operation of a door or platform to drop the bread product out of the toaster or operation of a conveyor to move the bread product away from the heating elements.

As noted previously, the toaster settings identified based upon the received product ID may further include adjustments or controls to the settings from which the operation of the toaster is adjusted intra-process. In a first example, the heater may operate at a first duty cycle for the start of the heat treatment process, while later changing to a second duty cycle at a later point in the heat treatment process. A change from a high duty cycle to a low duty cycle could cause a "searing" or "preheating" effect in the heat treatment process. A change from a low duty cycle to a high duty cycle could result in a "thawing" or "defrosting" effect. In a further example for toasters that include a conveyor, a conveyor speed may be adjusted. As will be recognized, the conveyor speed relates to the toasting time, therefore an adjustment to the conveyor speed can lengthen the toasting process or shorten the toasting process. This may be based upon the progression of the accumulated system energy to the target energy compared to the progression of the bread product through the toaster along the conveyor. An adjustment to the conveyor speed can be made during the toasting process so that the bread product is ejected from the toaster as the accumulated system energy reaches the target energy. The period during the heat treatment process when the toaster settings are adjusted may be defined by an adjustment criteria. The adjustment criteria may exemplarily be an amount of accumulated system energy from 116. Exemplarily, at 122, the accumulated system energy is compared to an adjustment criteria of a predetermined amount of accumulated system energy after which the toaster is operated at the second duty cycle, second heating element current, second conveyor speed or other changed toaster settings.

In addition to the use of the accumulated system energy by the heating elements to control a single toasting operation, the accumulated system energy can be further used in a feedback loop to improve the control of successive toasting operations to account for the heat retained within the system between individual cycles of toasting. This is performed in the method 100 by incorporating an initial energy factor at 124 into the action of accumulating the system energy at 116. Thus, the system energy is calculated using the following equation:

$$\text{System Energy} = \text{Initial Energy} + \Sigma(\text{Energy}_{IN} - \text{Energy}_{OUT}) \quad \text{(Eq. 6)}$$

The initial energy is a time-based determination reflecting the cooling of the toaster from when the previous treatment cycle is ended (and the heating elements turned off) and when the next treatment cycle begins (and the heating elements turned on) and the system begins to heat again. The time between the treatment cycles is measured by a timer that starts operation at 126 when the target energy has been reached at 118, and the treatment cycle ended at 120. The timer begins to count the elapsed time and continues counting such time until the heaters start for the next toasting process. This elapsed time is used to calculate the initial energy in a specific application of the energy decay from Eq. 2 above in the following equation:

$$\text{Initial Energy} = \text{EnergyDecay}(t_E) = A e^{B t_E} \quad \text{(Eq. 7)}$$

The initial energy is the remaining energy in the system prior to the introduction of new energy for the next toasting cycle. The initial energy, therefore, is calculated based upon the system energy at the end of the previous toasting cycle and the energy decay during the elapsed time ($t_E$) between treatment cycles. Once the constant B of Equation 2 reflecting the thermal characteristics of the toasting system have been empirically determined, these values may be stored into a computer-readable medium accessible by the CPU as an energy decay model at 128. Using the energy decay model 128 with the elapsed time ($t_E$) outputs a decimal which when multiplied by the peak accumulated energy (A) from the previous treatment cycle (which may often be the target energy of the previous treatment cycle), results in the initial heating energy remaining in the system at the start of the next toasting process.

In an example, the calculation of the initial energy can be simplified by presenting the energy decay model at 128 as a lookup table based upon the inputs of peak accumulated energy (or final energy at the end of a toasting cycle) and elapsed time until the start of the next toasting cycle. In addition, the system may include a predefined "cold start" elapsed time after which no initial energy adjustment is made to the system energy accumulation calculated at 116.

When the toaster is operated, for example, according to the method 100, across a plurality of successive treatment cycles, the accumulated energy, and that as reflected in the heater settings may include a minimum toasting time and/or a conveyor speed. It will be recognized that in toaster devices that include a conveyor, the conveyor speed may generally relate to the toasting time.

In one example, the initial energy in the toaster may be such that the toasting time is lowered to the minimum. If that minimum time and toaster operation is still more than is determined to achieve the toasting level, then the energy input to the heating elements may be reduced during the toasting process. The reduction of energy to the heating elements may be done in a variety of ways, including, but not limited to reducing a duty cycle of the energy to the heating elements or providing less current to the heating elements. Another solution is to delay energization of the heating elements, instead initially relying upon the remaining heat in the toaster to start the toasting process. If the energization of the heating elements is delayed, then the initial energy in the energy accumulation may be similarly reduced until the heating elements are energized.

In a further example, the toaster may be one of a variety of conveyor toasters which requires a significant warm-up process before the entire toaster is to a temperature to achieve normal toasting operation. Commonly in these devices, the toaster is operated to warm up to the toasting temperature, then bread products fed into the toaster. With the latent heat control as described herein, a bread product can be loaded into the toaster at the start of the warm-up process, and the heating element energy accumulated. Because such a toaster relies, in part, upon maintaining a large initial energy to achieve the normal toasting operation, in a cold start, the toaster will have little or no initial energy, and the resulting toasting time will be long (e.g. slow conveyor speed). As the toaster heats up, the toasting time (conveyor speed) can be reevaluated so that the bread product exits the toaster when the target energy is reached. This may promote energy efficiency as the toaster warm-up energy can also be used to toast bread products for use.

The examples and equations provided herein are done so for exemplary purposes. It will be recognized that using the equations and processes described above with respect to the method presented in FIG. 3 as a start, optional refinements to the process may be made in order to provide greater control accuracy particularly across environments or use conditions. As described above with respect to FIG. 1, the toaster may include one or more ambient temperature sensor and the ambient temperature measured therefrom is provided to the controller. As thermal transfer relates to the surrounding temperature differential, the ambient temperature can impact the amount of heat loss in the calculations above. By way of examples, a toaster will experience greater latent heat loss due to environmental cooling during winter in an unheated warehouse, near an exterior door, or near the drive-through window, than the same toaster will experience next to the grills, ovens, or fryers in the interior of an un-air-conditioned kitchen. Ambient temperature can be measured from a temperature sensor integrated with the toaster, and for example, exposed to the exterior of the toaster, or in a location exposed to the exterior like a fresh air intake for an electronics cooling fan. The ambient temperature may also be provided from a separate temperature monitoring device which communicatively provides this information to the processor of the toaster. Therefore, particularly equations 2, 4, and 6 above can be modified to incorporate the additional factor of ambient temperature in addition to the constants (B or C) representing the thermal characteristics of the toaster system itself. The ambient temperature is reflected, for example in an application of Newton's Law of cooling using a measured ambient temperature:

$$T(t)=Ce^{kt}+T_m \quad \text{(Eq. 8)}$$

Similarly, one or more draft sensors may be incorporated into the toaster. A draft sensor may be in the form of an anemometer and provides information regarding the external airflow around the toaster. As with the ambient temperature, a toaster below an HVAC vent will experience more heat loss than a toaster in a location with relatively undisturbed air surrounding it. Measurements from the anemometer can be provided to the controller to further adjust the calculations of heat loss. In one embodiment, the controller may have a single correction factor or two correction factors based upon detected air circulation, wherein the controller selects between limited correction factor options based upon a range of detected air circulation. While the base calculations of heat loss may be considered under "normal" air circulation conditions, one correction factor may be applied for instances of "high" air circulation or a further correction factor applied for instances of "very high" air circulation. It will also be recognized that these correction factors can be selected for during each iteration of the calculations and that the detected air circulation, and any resulting correction, may change during even a single toasting process.

The present disclosure has used the example of toasting a bread product as an example of the applications of the latent heat control system and method as described herein, although persons of ordinary skill in the art will appreciate from this disclosure other applications or settings within which this control may be used. While an example of a toaster apparatus has been provided, it is understood that toasting or heat treatment devices, including but not limited to, those as disclosed and described in U.S. Pat. No. 8,789,459, entitled "Food Heating Device"; US2010/00239724, entitled "Toaster with Cooling Air Stream"; US2018/0294595, entitled "Conveyor Oven with Varying Emitted Infrared Profiles"; US2018/0289209, entitled "Toaster with Adjustable Conveyor"; and U.S. patent application Ser. No. 16/448,359, entitled "Infrared Toaster", all of which are hereby incorporated by reference in their entireties. In a still further example of use, the latent heat control as shown and described herein may be implemented as a redundant control system in combination with another control system, for example, but not limited to, the optical-based control systems as described in Ser. No. 16/448,359.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of toasting control, the method comprising:
energizing at least one heating element at a start of a toasting process;
calculating an initial energy at the start of the toasting process, the initial energy representing heat retained from a previous toasting process;
iteratively acquiring a voltage across the at least one heating element;
iteratively acquiring a current to the at least one heating element;
adding the initial energy into an accumulated system energy that is iteratively accumulated based on the iteratively acquired voltage and current; and
ending the toasting process, with a controller, when the accumulated system energy; reaches a target energy.

2. The method of claim 1, further comprising:
receiving an identification of a bread product for the toasting process, from the identification of the bread product, identifying the target energy associated with the bread product.

3. The method of claim 1, further comprising:
receiving an ambient temperature exterior of a toaster comprising the at least one heating element from an ambient temperature sensor of the toaster;
using the ambient temperature in calculating an energy loss over time during the toasting process; and
reducing the accumulated system energy based upon the calculated energy loss over time.

4. The method of claim 1, wherein ending the toasting process comprises ending energization to the at least one heating element.

5. The method of claim 4, further comprising:
counting an elapsed time with a timer that starts when energization to the at least one heating element ends in the previous toasting process and the timer ends when the toasting process starts; and
further calculating the initial energy at the start of the toasting process based upon the elapsed time.

6. The method of claim 5, further comprising:
receiving at the controller a final accumulated energy from the previous toasting process and receiving an energy decay model; and
further calculating the initial energy from the final accumulated energy, the elapsed time, and the energy decay model.

7. The method of claim 6, further comprising empirically determining the energy decay model for the toaster.

8. The method of claim 1, further comprising:
receiving an identification of a bread product for the toasting process;
from the identification of the bread product, identifying an initial toaster setting and an adjustment criteria;
wherein the at least one heating element is energized according to the initial toaster setting at the start of the toasting process; and
comparing the accumulated system energy to the adjustment criteria, and adjusting an operation of the toaster when the adjustment criteria is met.

9. The method of claim 8, wherein the operation of the toaster is a conveyor speed.

10. The method of claim 1 wherein acquiring the voltage across the at least one heating element comprises measuring a total voltage to the toaster and subtracting a voltage drop attributable to electrical systems of the toaster besides the at least one heating element and acquiring the current to the at least one heating element comprises measuring a total current to the toaster and subtracting a current draw attributable to electrical systems of the toaster besides the at least one heating element.

11. The method of claim 1, wherein a toaster comprises the at least one heating element, a power supply, a power sensing circuit comprising a voltmeter and an ammeter, and the controller;
wherein the power supply is configured to energize the at least one heating element at the start of the toasting process;
wherein the voltmeter acquires the voltage across the at least one heating element and the ammeter acquires the current to the at least one heating element; and
receiving the voltage and the current at the controller from the power sensing circuit.

12. The method of claim 11, further comprising:
receiving a product ID at the controller; and
identifying the target energy from the product ID with the controller.

13. The method of claim 12, wherein the power sensing circuit is arranged between the power supply and the at least one heating element.

14. The method of claim 13, further comprising receiving a bread product within the toaster to a toasting position in proximity to the at least one heating element; and
wherein ending the toasting process further comprises the controller operating the toaster to eject the bread product from the toaster.

15. The method of claim 11, further comprising:
measuring an ambient temperature exterior of the toaster with at least one ambient temperature sensor;
receiving the measured ambient temperature from the at least one ambient temperature sensor at the controller;
using the measured ambient temperature in iteratively accumulating the accumulated system energy from the power over time, wherein the measured ambient temperature is used to calculate an energy loss over time; and
reducing the accumulated system energy based upon the calculated energy loss over time.

16. A method of toasting control in a toaster that comprises at least one heating element, a power supply, a power sensing circuit comprising a voltmeter and an ammeter, and a controller, the method comprising:

energizing at least one heating element with the power supply at a start of a toasting process;

iteratively acquiring a voltage across the at least one heating element with the voltmeter of the power sensing circuit;

iteratively acquiring a current to the at least one heating element with the ammeter of the power sensing circuit;

receiving the voltage and the current at the controller from the power sensing circuit;

calculating, with the controller, an initial energy at the start of the toasting process, the initial energy representing heat retained from a previous toasting process;

combining the initial energy into an accumulated system energy that is iteratively accumulated based on the iteratively acquired voltage and current; and ending the toasting process, with the controller, when the accumulated system energy reaches a target energy.

17. The method of claim 16, further comprising:

starting a count of an elapsed time with a timer when energization to the at least one heating element ends in the previous toasting process; and ending the count of the elapsed time with the timer upon a start of the toasting process;

wherein calculating the initial energy is further based upon the elapsed time; and wherein ending the toasting process further comprises the controller ending energization from the power supply to the at least one heating element.

18. The method of claim 17, wherein calculating the initial energy further comprises applying the elapsed time and a final accumulated energy from the end of the previous toasting process to an energy decay model.

19. The method of claim 1, wherein the accumulated system energy is iteratively accumulated from the iteratively acquired voltage and current by:

calculating, with a controller an accumulated delivered power from the iteratively accumulated voltage and current;

iteratively accumulating an energy loss over time during the toasting process; and reducing the accumulated delivered power with the iteratively accumulated energy loss to produce the accumulated system energy.

20. A method of toasting control, the method comprising:

energizing at least one heating element at a start of a toasting process;

iteratively acquiring a voltage across the at least one heating element;

iteratively acquiring a current to the at least one heating element;

receiving an ambient temperature exterior of a toaster comprising the at least one heating element from an ambient temperature sensor of the toaster;

using the ambient temperature in calculating an energy loss over time during the toasting process;

reducing the accumulated system energy based upon the calculated energy loss over time; and ending the toasting process, with a controller, when an accumulated system energy, that is iteratively accumulated based on the iteratively acquired voltage and current, reaches a target energy receiving an ambient temperature exterior of a toaster comprising the at least one heating element from an ambient temperature sensor of the toaster;

using the ambient temperature in calculating an energy loss over time during the toasting process; and reducing the accumulated system energy based upon the calculated energy loss over time.

* * * * *